United States Patent
Dontu et al.

(10) Patent No.: US 11,194,483 B1
(45) Date of Patent: Dec. 7, 2021

(54) ENRICHING A STORAGE PROVIDER WITH CONTAINER ORCHESTRATOR METADATA IN A VIRTUALIZED COMPUTING SYSTEM

(71) Applicant: VMware, Inc., Palo Alto, CA (US)

(72) Inventors: Venkata Balasubrahmanyam Dontu, Sunnyvale, CA (US); Divyen Kiritbhai Patel, Milpitas, CA (US); Heui Seong Kim, Santa Clara, CA (US); Te Wang, Mountain View, CA (US); Raunak Pradip Shah, Burlingame, CA (US); Sandeep Pissay Srinivasa Rao, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 6 days.

(21) Appl. No.: 16/893,865

(22) Filed: Jun. 5, 2020

(51) Int. Cl.
*G06F 3/06* (2006.01)
*G06F 9/54* (2006.01)
*G06F 9/455* (2018.01)

(52) U.S. Cl.
CPC ............ *G06F 3/0619* (2013.01); *G06F 3/067* (2013.01); *G06F 3/0646* (2013.01); *G06F 3/0662* (2013.01); *G06F 9/45558* (2013.01); *G06F 9/547* (2013.01); *G06F 2009/45579* (2013.01)

(58) Field of Classification Search
CPC ...... G06F 3/0619; G06F 3/0662; G06F 9/547; G06F 3/0646; G06F 3/067; G06F 9/45558; G06F 2009/45579
USPC .......................................................... 711/154
See application file for complete search history.

(56) References Cited

U.S. PATENT DOCUMENTS

2017/0371693 A1 12/2017 Corrie et al.
2021/0109683 A1* 4/2021 Cain ..................... G06F 3/0683

OTHER PUBLICATIONS

Ernst, E. et al. "Kata Containers Architecture," GitHub, Inc., 2019, 22 pages, URL: https://github.com/kata-containers/documentation/blob/master/design/architecture.md.
Koshkin, D. et al."Add the ability to provide arbitrary EBS volume tags, Issue #180," GitHub, Inc., 2019, 10 pages, URL: https://github.com/kubernetes-sigs/aws-ebs-csi-driver/issues/180.
VMware, Inc. "Overview of vSphere Integrated Containers," Product version: 1.5, 2019, 21 pages.
U.S. Appl. No. 16/751,529, filed Jan. 24, 2020, 48 pages.

* cited by examiner

*Primary Examiner* — Daniel D Tsui
*Assistant Examiner* — Zubair Ahmed
(74) *Attorney, Agent, or Firm* — Kim & Stewart LLP

(57) ABSTRACT

An example method of enriching a storage provider of a virtualized computing system with metadata managed by a container orchestrator executing in the virtualized computing system is described. The method includes detecting, by a metadata sync service executing as an extension of the container orchestrator, metadata that is included in a persistent volume-based (PV-based) object managed by the container orchestrator, the PV-based object referencing a persistent volume; and pushing, by the metadata sync service, the metadata to the storage provider to augment a storage volume object managed by the storage provider, the storage volume object referencing a storage volume backing the persistent volume.

20 Claims, 13 Drawing Sheets

ENRICHING A STORAGE PROVIDER WITH CONTAINER ORCHESTRATOR METADATA IN A VIRTUALIZED COMPUTING SYSTEM

Applications today are deployed onto a combination of virtual machines (VMs), containers, application services, and more. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes in a cluster (also referred to as "node cluster"). Containers in the same pod share the same resources and network and maintain a degree of isolation from containers in other pods. The pods are distributed across nodes of the cluster.

A Kubernetes system also supports stateful applications, where pods use persistent volumes (PVs) to store persistent data. Early Kubernetes versions included internal "provider" code that provisioned the storage volumes backing PVs within the underlying infrastructure (e.g., virtual disks stored on block devices). Recent Kubernetes versions utilize the container storage interface (CSI), which provides an application programming interface (API) between container orchestrators and storage providers to allow consistent interoperability. Third-party storage providers write and deploy CSI drivers (also referred to as CSI plugins) that extend Kubernetes to support underlying storage volumes of an infrastructure Kubernetes uses the CSI API to provision, attach, mount, and format the storage volumes exposed by the CSI driver. The CSI driver cooperates with a storage provider in the underlying infrastructure to manage persistent volume lifecycle operations for the containerized applications (e.g., create, attach, detach, delete, mount, and unmount of the storage volumes).

Kubernetes maintains various metadata for PVs, persistent volume claims (PVCs) (i.e., requests for persistent storage), and pods. This metadata includes PV/PVC/pod labels, PV/PVC/pod names, a cluster identifier (ID), and the like. From an administrative perspective, it is desirable to associate the relevant Kubernetes metadata with storage volume objects managed by the storage provider of the underlying infrastructure. The CSI drivers, however, are container orchestrator agnostic and do not present any Kubernetes metadata to the storage provider. An administrator can manually obtain Kubernetes metadata and attempt to associate it with the storage volume objects, but this is labor intensive and prone to error.

DETAILED DESCRIPTION

Figure 1:
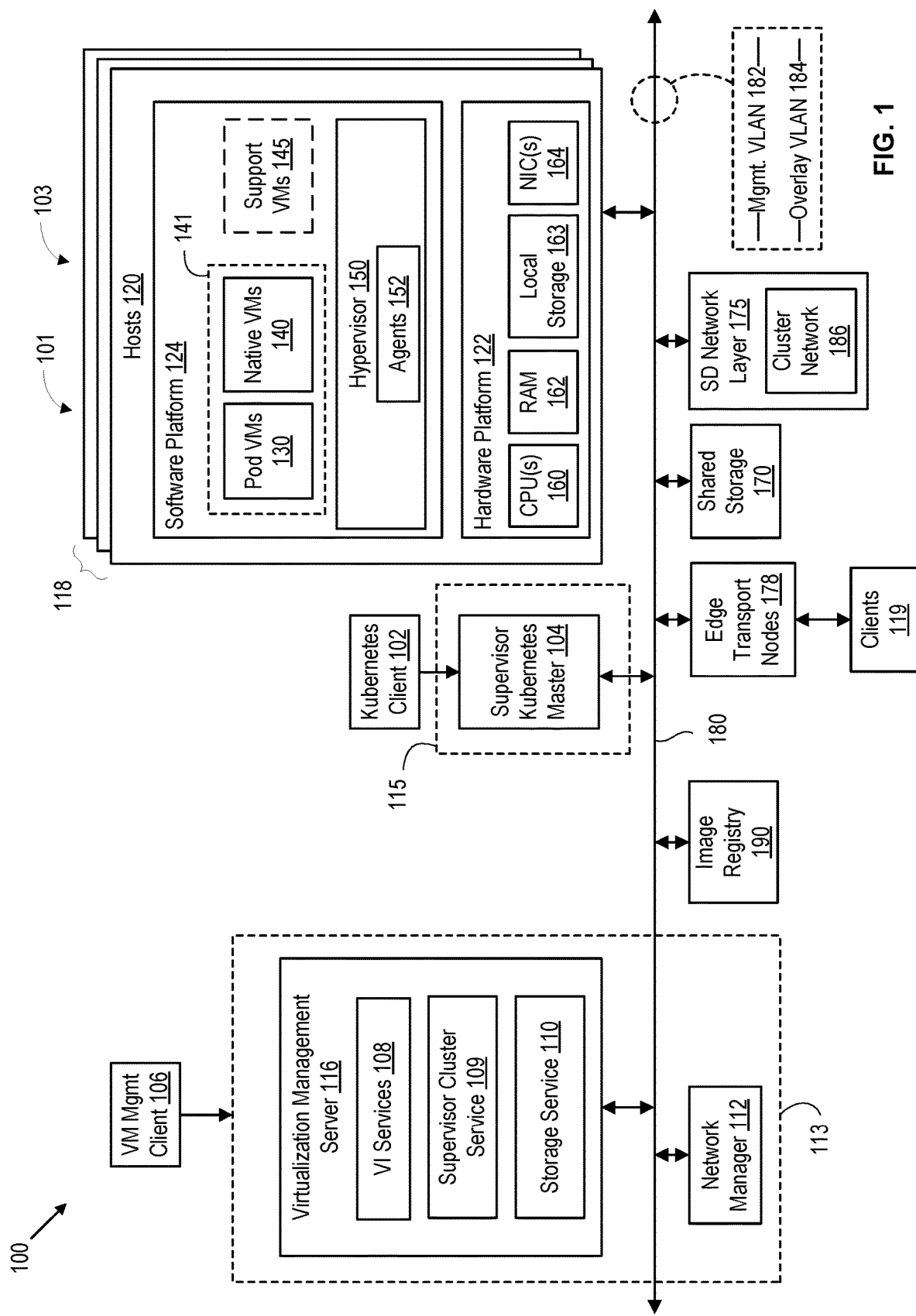
FIG. 1 is a block diagram of a virtualized computing system in which embodiments described herein may be implemented.

Techniques for enriching a storage provider with container orchestrator metadata in a virtualized computing system are described. In embodiments described herein, the virtualized computing system includes a cluster of physical servers ("hosts") referred to as a "host cluster." The host cluster includes a virtualization layer, executing on hardware platforms of the hosts, which supports execution of virtual machines (VMs). A virtualization management server manages the host cluster, the virtualization layer, and the VMs executing thereon. The virtualized computing system includes shared storage accessible by the host cluster. The container orchestrator executes in the virtualized computing system (e.g., on one or more VMs) and is configured to deploy and manage applications in the host cluster. In embodiments, the container orchestrator is a Kubernetes platform that deploys and manages containerized applications in a cluster of VMs (a "Kubernetes cluster"). For stateful applications, the container orchestrator is configured to manage persistent volumes. The container orchestrator includes a driver extension configured to cooperate with a storage provider of the virtualized computing system to perform lifecycle operations on storage volumes (e.g., virtual disks) in the shared storage that back the persistent volumes. The storage provider manages a database of objects associated with the storage volumes in use by the applications executing in the host cluster ("storage volume objects").

In one or more embodiments, container orchestrator executes a container storage interface (CSI) driver that cooperates with the storage provider but is agnostic with respect to the container orchestrator. The CSI driver cooperates with the storage provider to create and delete storage volumes. However, the CSI driver does not present any container orchestration metadata to the storage provider. In embodiments, the virtualized computing system includes synchronization software executing therein that detects container orchestrator metadata related to persistent volumes and pushes this metadata to the storage provider. The storage provider can then enrich its view of the storage volumes with the container orchestrator metadata detected by the synchronization software. The synchronization software further operates to keep the storage provider up to date with the current state of the relevant container orchestrator metadata. The techniques described herein allow an administrator to have visibility into which applications executing in the host cluster are using which storage volumes as persistent storage. The disclosed techniques further assist the administrator to debug and troubleshoot storage issues and quickly locate affected applications.

In one or more embodiments, the container orchestrator executes in VMs of the host cluster and is capable of directly accessing the storage provider (e.g., through a management network). For example, a Kubernetes platform can be deployed in a cluster of VMs executing on the hosts. This is referred to herein as a "vanilla" container orchestrator environment. The synchronization software executes as an extension of the container orchestrator (e.g., in a storage control plane with the CSI driver) and cooperates directly with the storage provider to enrich it with the container orchestrator metadata (e.g., metadata derived from Kubernetes persistent volume objects, persistent volume claim objects, pod objects, etc.).

In one or more embodiments, the virtualized computing system includes an orchestration control plane comprising a container orchestrator having extensions that cooperate with the virtualization management server and agents installed in the virtualization layer. A host cluster having the orchestration control plane is referred to herein as a "supervisor cluster." A user interacts with the orchestration control plane to deploy and manage applications executing on the supervisor cluster. In embodiments, the orchestration control plane uses hosts to implement nodes, and VMs to implement pods, of a Kubernetes cluster. Kubernetes pods are implemented as "pod VMs," each of which includes a kernel and container engine that supports execution of containers. The container orchestrator (e.g., Kubernetes) executes in VMs alongside the pod VMs. Similar to the vanilla container orchestrator environment, the synchronization software in a supervisor cluster environment executes as an extension to the container orchestrator (e.g., in a storage control plane with the CSI driver) and cooperates directly with the storage provider to enrich it with the container orchestrator metadata.

In one or more embodiments, an application deployed in a supervisor cluster comprises a container orchestration platform, such as a Kubernetes platform. In such case, a guest Kubernetes cluster executes as a virtual extension of the supervisor cluster and is referred to herein as a "guest cluster." Such an embodiment includes a guest container orchestrator executing as part of the deployed guest cluster, and a supervisor container orchestrator executing as part of the orchestration control plane of the supervisor cluster. The supervisor container orchestrator manages the guest cluster as an application deployed across VMs in the supervisor cluster. In embodiments, the guest cluster is isolated from the storage provider (e.g., the guest cluster is isolated from the management network). However, the guest cluster has network access to the supervisor container orchestrator (e.g., through a cluster network). The guest cluster includes a paravirtual CSI driver that cooperates with the supervisor container orchestrator, which in turn cooperates with the storage provider. The synchronization software executes as an extension of the guest container orchestrator (e.g., in a storage control plane with the paravirtual CSI driver) and cooperates with the supervisor container orchestrator to push down container orchestrator metadata updates from the guest cluster. The supervisor container orchestrator then pushes the container orchestrator metadata to the storage provider.

Accordingly, the synchronization software described herein can execute in different environments, including a vanilla container orchestrator environment, a supervisor cluster environment, and a guest cluster environment. These and further advantages and aspects of the disclosed techniques are described below with respect to the drawings.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized)(e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 18.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, Calif.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 and network manager 112 comprise a virtual infrastructure (VI) control plane 113 of virtualized computing system 100. Virtualization management server 116 can include a supervisor cluster service 109, storage service 110, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
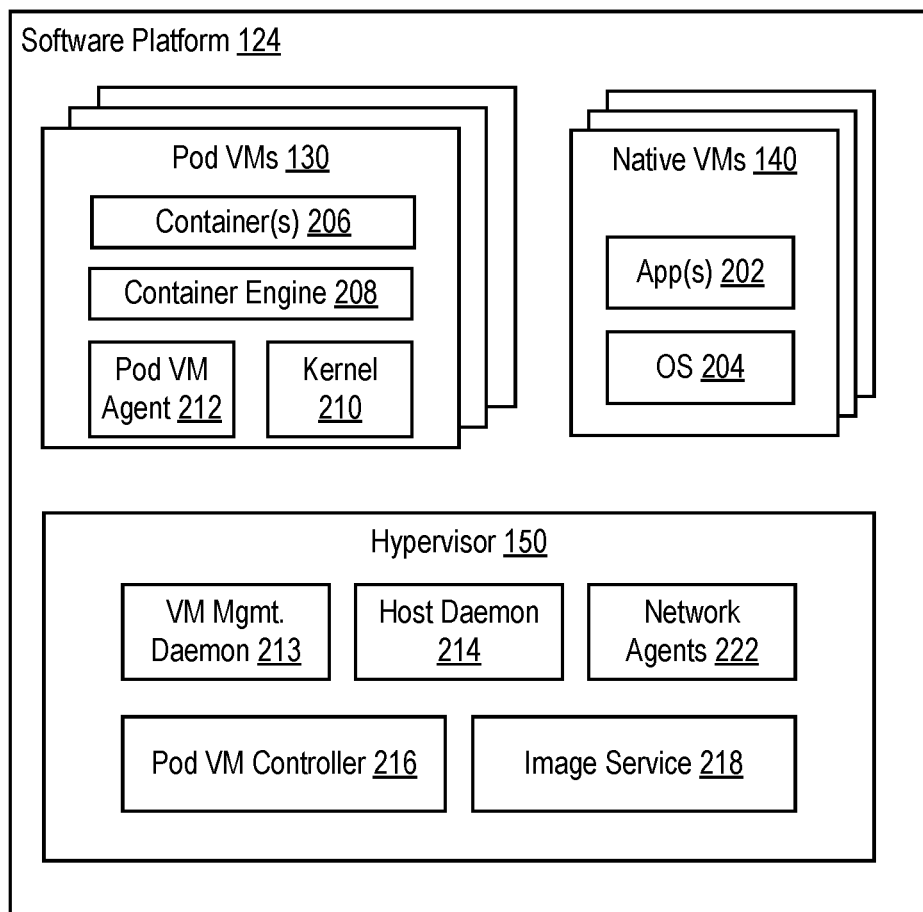
FIG. 2 is a block diagram depicting a software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native Ms 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod N agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

Figure 3:
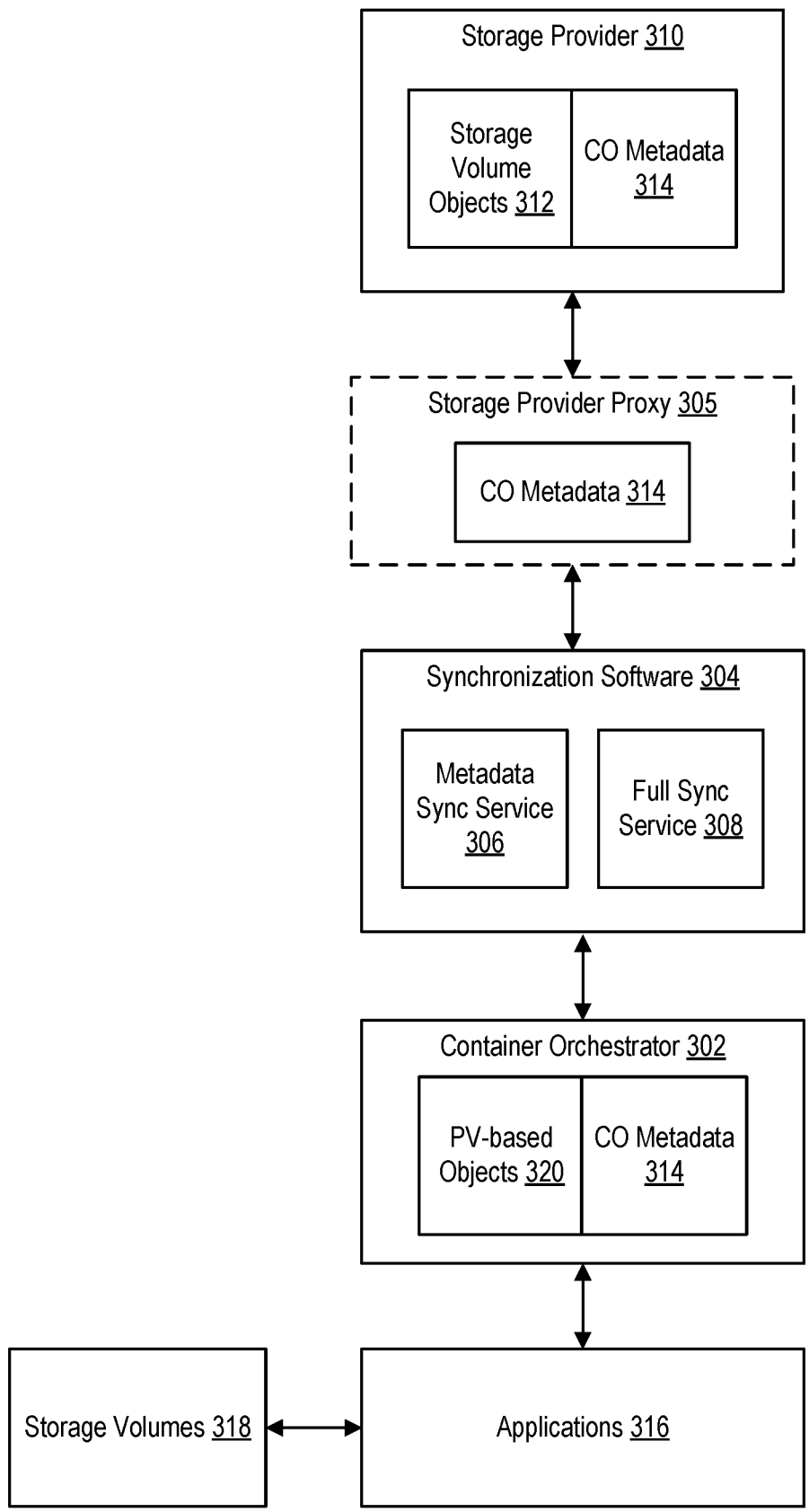
FIG. 3 is a block diagram depicting a logical view of metadata synchronization between a container orchestrator and a storage provider in a virtualized computing system according to an embodiment.

FIG. 3 is a block diagram depicting a logical view of metadata synchronization between a container orchestrator and a storage provider in a virtualized computing system according to an embodiment. Container orchestrator 302 executes in virtualized computing system 100. A user interacts with container orchestrator 302 to deploy and manage applications 316 according to a desired state of a node cluster (e.g., a Kubernetes cluster). Container orchestrator 302 manages objects that include the desired state, including persistent volume-based (PV-based) objects 320. Each of PV-based objects 320 defines, requests, or consumes a persistent volume. A persistent volume is storage that has a lifecycle independent of the lifecycle of applications 316. A persistent volume contrasts with ephemeral storage, which is created and deleted with creation and deletion of an application 316.

A storage provider 310 provisions and manages lifecycle of storage volumes 318 (e.g., virtual disks) to back PVs managed by container orchestrator 302. In an embodiment, storage provider 310 comprises storage service 110 executing in virtualization management server 116. Storage provider 310 tags storage volumes 318 for use by container orchestrator 302 by maintaining storage volume objects 312. Each storage volume object 312 includes various infrastructure information related to a storage volume 318, such as volume ID, volume name, storage policy, datastore ID, health, and the like. Storage provider 310 can obtain the infrastructure information from VI control plane 113 (e.g., VI services 108). Applications 316 access storage volumes 318 to read and store their persistent data.

In embodiments, PV-based objects 320 include persistent volumes (PVs), persistent volume claims (PVCs), and pods (e.g., Kubernetes PVs, PVCs, and pods). A PV is an object representing a persistent volume provisioned statically by an administrator/user or provisioned dynamically by container orchestrator 302 in response to a PVC. A PV includes a specification that defines a persistent volume and a status. The specification includes metadata, such as a name of the PV, a volume ID of a storage volume 318 backing the PV, and optionally one or more labels associated with the PV. The specification further includes attributes of the PV, such as capacity, volume mode, access mode, reclaim policy, storage class, mount options, and the like. The PV status is one of a plurality of phases, such as pending (not available), available, bound, released, failed, etc. A PVC is a request for a persistent volume. A PVC includes a specification and a status. The specification includes metadata, such as a name of the PVC, a cluster ID, a namespace, and optionally one or more labels associated with the PVC. The specification further includes attributes of the PVC, such as access mode, volume mode, resource requests, storage class, and the like. The PVC status is one of a plurality of phases, such as pending (not available), bound, terminating, etc. A PVC is bound when assigned to a PV. Pods consume persistent volumes using PVCs. A pod includes a specification and a status. The specification includes metadata, such as a name of the pod and optionally one or more labels. The specification further includes attributes of the pod, such as containers and PVCs. PV-based objects 320 include container orchestrator (CO) metadata 314, which encompasses the various metadata discussed above for PVs, PVCs, and pods (e.g., names, labels, identifiers, etc.). Information in the labels can include, for example, a name of an application, a name of an instance of an application, an application version, an application component, and the like.

Synchronization software 304 executes in virtualized computing system (e.g., in a VM 130/140). Synchronization software 304 includes a metadata sync service 306 and a full sync service 308. Synchronization software 304 is configured to synchronize CO metadata 314 in container orchestrator 302 with storage provider 310 to enrich storage volume objects 312. Metadata sync service 306 is configured to detect create, update, and delete events for PV-based objects 320. For create/update events, metadata sync service 306 determines if CO metadata 314 has been updated and, if so, pushes updates of CO metadata 314 to storage provider 310. The updates are tagged by volume IDs of those storage volumes 318 with which the metadata updates are associated. For delete events, metadata sync service 306 requests removal of CO metadata 314, which is associated with the deleted PV-based objects 320, from storage provider 310. Full sync service 308 executes in parallel with metadata sync service 306 and functions independent of create, update, and delete events for PV-based objects 320. Rather, full sync service 308 performs a full synchronization, according to a schedule or on demand, of CO metadata 314 managed by a metadata consumer and CO metadata 314 managed by container orchestrator 302. In embodiments, the metadata consumer is storage provider 310. In other embodiments, the metadata consumer is a storage provider proxy 305, as discussed further below. Techniques for synchronizing CO metadata 314 between a container orchestrator and a storage provider in different container orchestrator environments are discussed below.

Figure 4:
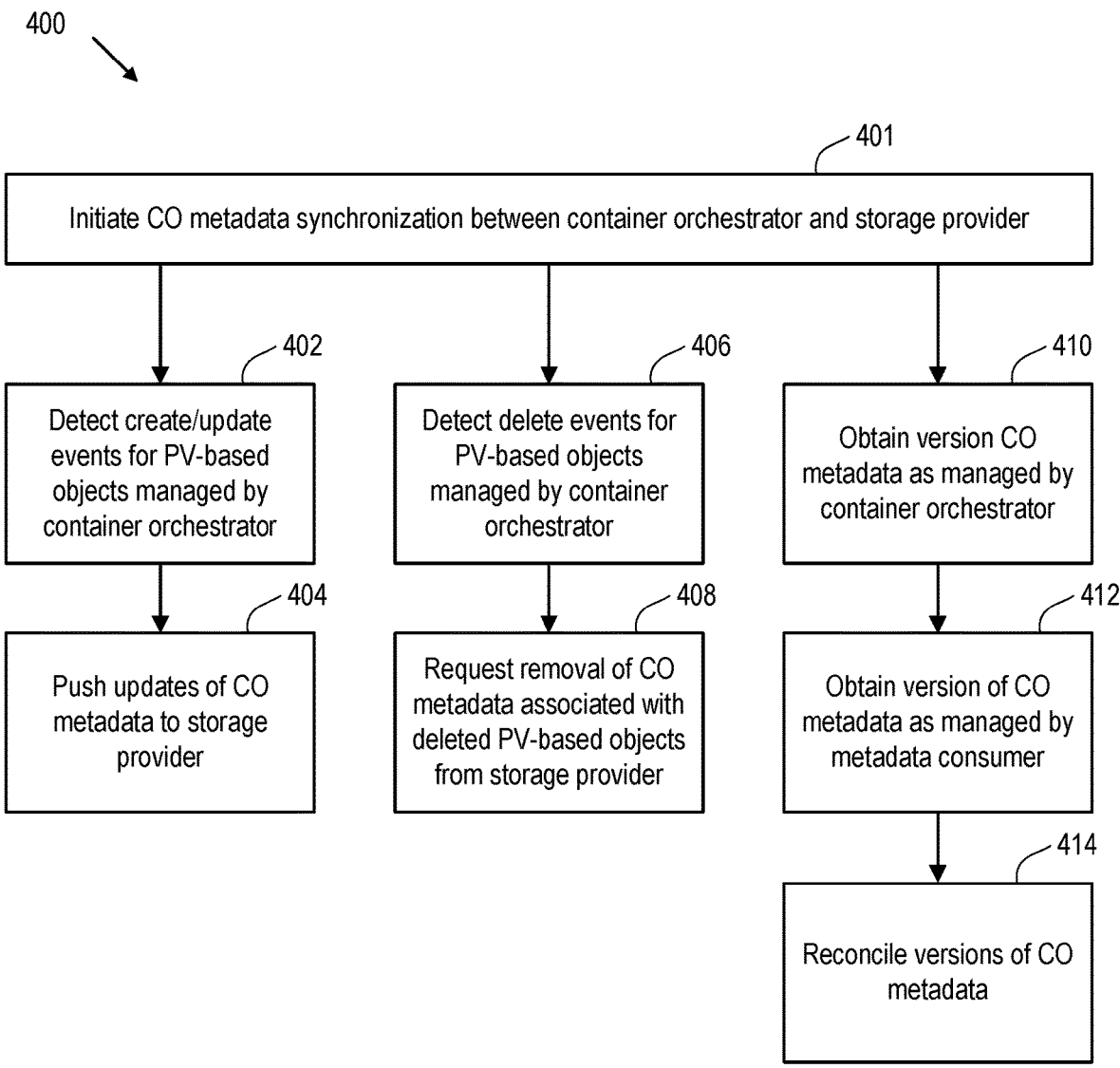
FIG. 4 is a flow diagram depicting a method of enriching a storage provider with container orchestrator metadata in a virtualized computing system according to an example.

FIG. 4 is a flow diagram depicting a method 400 of enriching a storage provider with container orchestrator metadata in a virtualized computing system according to an example. Method 400 can be performed by synchronization software 304 executing on CPU, memory, storage, and network resources managed by a virtualization layer (e.g., a hypervisor) or a host OS.

Method 400 includes a metadata synchronization process and a full synchronization process that execute in parallel. Metadata synchronization process includes CO metadata update operations (steps 402 and 404) and CO metadata delete operations (steps 406 and 408). Full synchronization process includes steps 410-414. Method 400 begins at step 401, where synchronization software 304 initiates CO metadata synchronization between container orchestrator 302 and storage provider 310.

At step 402, metadata sync service 306 detects create/update events for PV-based objects 320 managed by container orchestrator 302. This includes, for example, create/update of PVs, PVCs, and/or pods. At step 404, metadata sync service 306 pushes updates of CO metadata 314 to storage provider 310. This includes, for example, updates of PV, PVC, and/or pod metadata tagged with volume IDs of associated storage volumes 318. Metadata sync service 306 repeats steps 402 and 404 for each create/update event for a PV-based object managed by container orchestrator 302. In some embodiments, synchronization software 304 is capable of direct communication with storage provider 310 (e.g., synchronization software 304 executes in a VM having access to the management network). In such embodiments, metadata sync service 306, at step 404, pushes the updates of CO metadata 314 directly to storage provider 310. In other embodiments, synchronization software 304 cannot directly communicate with storage provider 310 (e.g., synchronization software 304 is isolated from the management network). In such embodiments, metadata sync service 306 pushes updates of CO metadata 314 to storage provider 310 through storage provider proxy 305, which has access to both synchronization software 304 and storage provider 310. For example, in a guest cluster environment, synchronization software 304 executing in a guest cluster can push updates to CO metadata 314 to a supervisor container orchestrator, which in turn pushes the updates of CO metadata 314 to storage provider 310. A guest cluster environment is discussed further below.

At step 406, metadata sync service 306 detects delete events for PV-based objects 320 managed by container orchestrator 302. This includes, for example, deletion of PVs, PVCs, and/or pods. At step 408, metadata sync service 306 requests removal of metadata of CO metadata 314, which is associated with deleted PV-based objects, from storage provider 310. This includes, for example, removal requests of PV, PVC, and/or pod metadata tagged with volume IDs of associated storage volumes 318. Metadata sync service 306 repeats steps 406 and 408 for each delete event for a PV-based object managed by container orchestrator 302. Similar to metadata updates discussed above, metadata sync service 306 can either request removal CO metadata directly with storage provider 310 or through storage provider proxy 305.

At step 410, full sync service 308 obtains a version of CO metadata 314 managed by container orchestrator 302. At step 412, full sync service 308 obtains a version of CO metadata 314 managed by a metadata consumer. In an embodiment, the metadata consumer is storage provider 310 (e.g., in cases where synchronization software 304 is capable of direct communication with storage provider 310). In another embodiment, the metadata consumer is storage provider proxy 305 (e.g., in a guest cluster environment where synchronization software 304 is isolated from storage provider 310). At step 414, full sync service 308 reconciles the versions of CO metadata between container orchestrator 302 and the metadata consumer. In embodiments, full sync service 308 treats CO metadata 314 managed by container orchestrator 302 as the source of truth for the reconciliation at step 414. Full sync service 308 can repeat steps 410-412 according to a schedule or on demand to perform a full synchronization of the CO metadata.

Figure 5A:
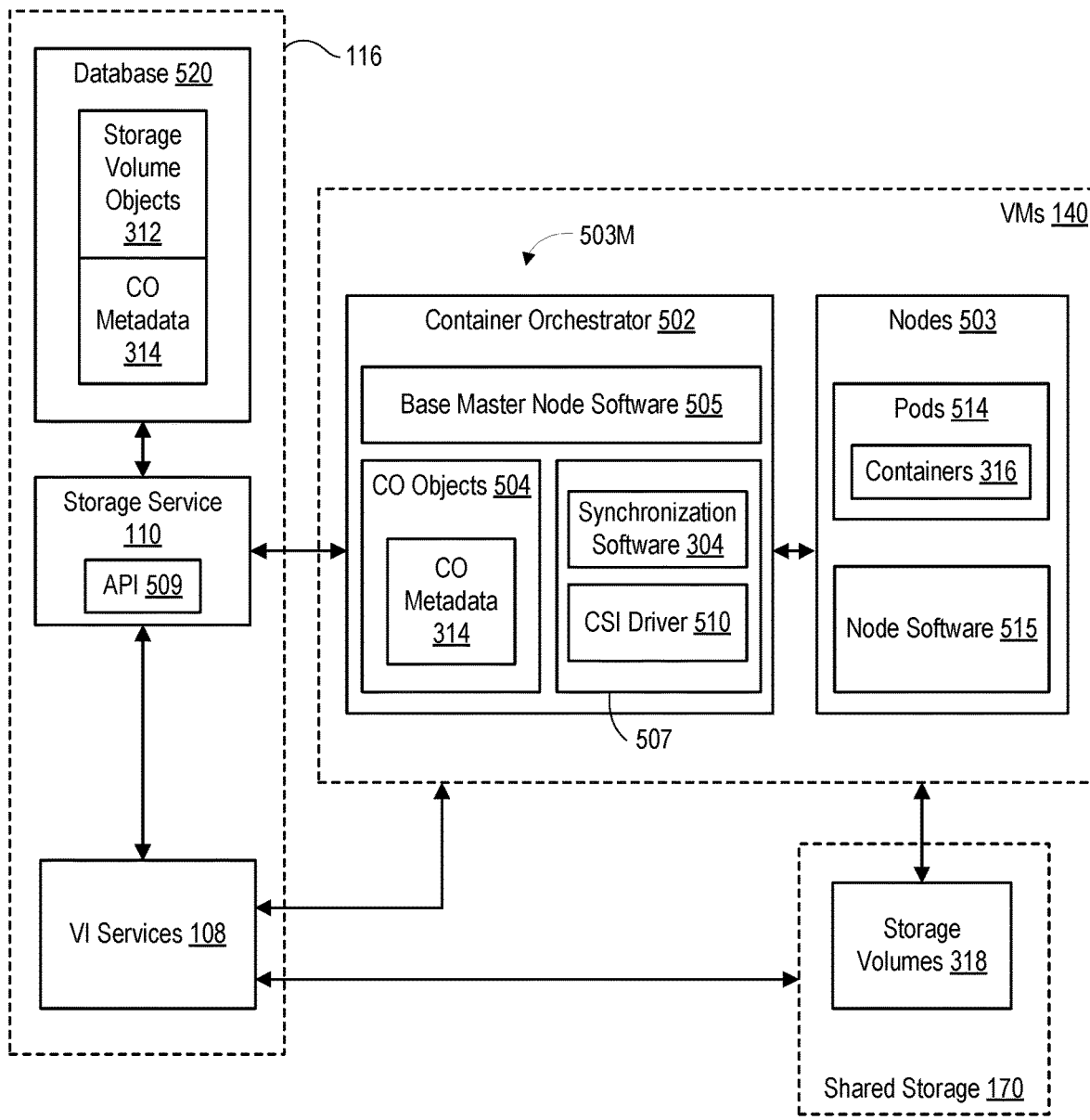
FIG. 5A is a block diagram depicting a logical view of a metadata synchronization in a vanilla container orchestrator environment according to an embodiment.

FIG. 5A is a block diagram depicting a logical view of a metadata synchronization in a vanilla container orchestrator environment according to an embodiment. A container orchestrator 502, such as Kubernetes, executes in one or more native VMs 140 of host cluster 118. In this embodiment, host cluster 118 is not enabled as a supervisor cluster 101. Container orchestrator 502 can communicate directly with storage service 110 (e.g., through a management network). In an embodiment, storage service 110 executes in virtualization management server 116. Storage service 110 manages a database 520 that stores storage volume objects 312. Database 520 can execute in virtualization management server 116 or external to virtualization management server 116 (e.g., in a separate VM). Storage service 110 includes an API 509. API 509 includes create, tag, read, update, un-tag, and delete APIs, metadata update and retrieval APIs, and volume attach/detach APIs. Storage service 110 cooperates with VI services 108 to create and delete storage volumes 318 in shared storage 170 (e.g., virtual disks), as well as to attach and detach storage volumes 318 to and from VMs 140. Storage volume objects 312 are enriched with CO metadata 314, as discussed above.

For example, API 309 can include CreateVolume, DeleteVolume, AttachVolume, DetachVolume, UpdateVolumeMetadata, and QueryVolume APIs. Input data to the CreateVolume API can dictate whether storage service 110 creates a storage volume and corresponding storage volume object or tags an existing storage volume for management by creating only the corresponding storage volume object. Similarly, input data to the DeleteVolume API can dictate whether storage service 110 deletes a storage volume and the corresponding storage volume object or un-tags a storage volume from management by deleting only the corresponding storage volume object. Input data to the CreateVolume API can further include CO metadata to augment a corresponding storage volume object. Input data to the DeleteVolume API can further include a request to delete CO metadata from database 520. Input data to the UpdateVolumeMetadata API specifies an update to CO metadata stored in database 520 based on volume IDs of storage volumes 318. The QueryVolume API returns a list of volume IDs from storage volume objects 312 (and optionally any other data of storage volume objects 312 and/or CO metadata 314 augmenting storage volume objects 312). The AttachVolume and DetachVolume APIs can be invoked to attach/detach storage volumes 318 from VMs.

A node cluster executes in VMs 140 (e.g., on hosts 120 in host cluster 118 managed by virtualization management server 116). The node cluster includes nodes 503, which in turn include one or more master nodes 503M. Container orchestrator 502 executes in master node(s) 503M. Container orchestrator 502 includes base master node software 505 and a storage control plane 507 executing as an extension of base master node software 505. Base master node software 505 comprises various control plane components executing on a guest operating system (e.g., as containers supported by a container runtime executing on Linux). In Kubernetes, for example, base master node software 505 comprises an API server (kube-api-server), a scheduler (kube-scheduler), a controller manager (kube-controller-manager), and the like. The base software of container orchestrator 502 is extended by storage control plane 507. In embodiments, storage control plane 507 includes synchronization software 304 and a CSI driver 510. Nodes 503 include node software 515, which includes a guest operating system (e.g., Linux), a container runtime (e.g., Docker®), a container orchestrator agent (e.g., kubelet), a CSI node driver, and the like. Users interact with container orchestrator 502 to deploy containerized applications on pods 514 executing in nodes 503. Pods 514 include containers 516 supported by node software 515.

Container orchestrator 502 manages CO objects 504 that are created, read, updated, and deleted through an API of base master node software 505 (e.g., the Kubernetes API).

CO objects 504 include PV-based objects 320 such as PVs, PVCs, and pods. CO objects 504 include CO metadata 314, which encompasses the various metadata discussed above for PV-based objects 320 (e.g., names, labels, identifiers, etc.).

In some cases, an administrator can statically create storage volumes 318 and corresponding PVs in container orchestrator 502. The administrator can interact with VI services 108 to create storage volumes 318, and then interact with container orchestrator to create PVs backed by storage volumes 318. In such case, the statically provisioned storage volumes may or may not be tagged by storage service 110 for management.

In some cases, a user can interact with container orchestrator 502 to create PVCs and pods referencing PVCs. In response, base master node software 505 attempts to bind PVs to the PVCs based on their specifications. If there are no available PVs for a PVC, base master node software 505 cooperates with CSI driver 510 using a CSI API to create a storage volume dynamically for a PV to be bound to the PVC. The CSI API can include APIs for creating volumes, attaching volumes, detaching volumes, deleting volumes, and the like ("persistent volume lifecycle operations"). Base master node software 505 calls a create volume API of CSI driver 510 in response to a PVC with no available PVs. Base master node software 505 calls a delete volume API of CSI driver 510 in response to deletion of a PVC (depending on reclaim policy). CSI driver 510 cooperates with storage service 110 through API 509 (e.g., calling create volume, delete volume, attach volume, and detach volume APIs of storage service 110 to perform persistent volume lifecycle operations). CSI driver 510 is agnostic to container orchestrator 302 and does not push CO metadata 314 to storage service 110 during persistent volume lifecycle operations.

Synchronization software 304 executes in the virtualized computing system and monitors CO objects 504 for CO metadata 314 (e.g., PV-based objects). In embodiments, synchronization software 304 executes in a VM 140 alongside CSI driver 510 (e.g., storage control plane 507 executes in a VM). In other embodiments, synchronization software 304 executes in a separate VM from CSI driver 510. In embodiments, synchronization software and/or CSI driver 510 execute in the same VM as base master node software 505. In other embodiments, one or both of synchronization software 304 and CSI driver 510 execute in a VM separate from base master node software 505.

In embodiments, synchronization software 304 installs informers with base master node software 505 to listen to events generated from manipulation of PV-based objects. When the PV-based objects are added, updated, or deleted, base master node software 505 generates events that are noticed by the informers of synchronization software 304. Responsive to the events, synchronization software 304 obtains CO metadata 314 from CO objects 504. Synchronization software 304 pushes CO metadata 314 to storage service 110 to enrich storage volume objects 312. For example, synchronization software 304 can invoke a metadata update API of storage service 110 to update its version of CO metadata 314 in response to lifecycle operations on PVs, PVCs, and pods. Synchronization software 304 can also perform full synchronization operations upon command or periodically to ensure CO metadata 314 stored in database 520 is consistent with CO metadata 314 maintained by container orchestrator 502. Embodiments of full synchronization are described below.

Figure 6A:
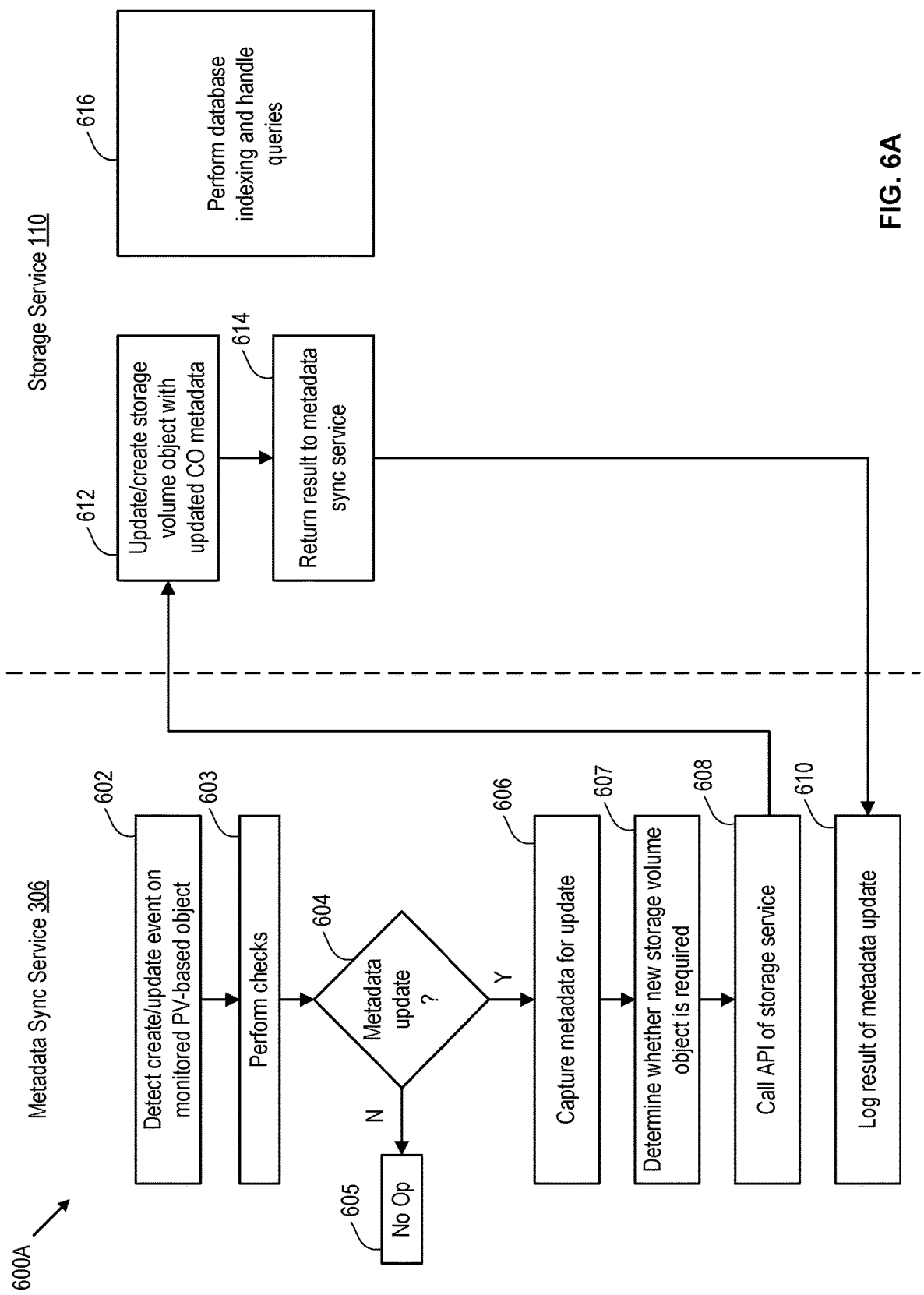
FIG. 6A is a flow diagram depicting a method of metadata synchronization for create/update events in a virtualized computing system according to an embodiment.

FIG. 6A is a flow diagram depicting a method 600A of metadata synchronization for create/update events in a virtualized computing system according to an embodiment. Method 600A can be performed by metadata sync service 306 in cooperation with storage service 110 executing on CPU, memory, storage, and network resources managed by virtualization layer(s) (e.g., hypervisor(s)) or a host operating system(s). Method 600A can be understood with reference to FIGS. 3 and 5A and can be performed for metadata synchronization in a vanilla container orchestration environment.

Method 600A begins at step 602, where metadata sync service 306 detects a create/update event on a monitored PV-based object 320. At step 603, metadata sync service 306 performs one or more checks to determine if a metadata update is required. In embodiments, metadata sync service 306 does not perform a metadata update operation in cases where a PVC is unbound, a PV is not managed by storage service 110, the metadata in the object has not changed (i.e., the update event is for something other than an update to the metadata), or the current object status is pending/failed. At step 604, metadata sync service 306 determines if an update should proceed based on the checks in step 603. If not, method 600A proceeds to step 605 and performs no operation. Otherwise, method 600A proceeds to step 606.

At step 606, metadata sync service 306 captures the metadata from PV-based object associated with the event. At step 607, metadata sync service 306 determines whether storage service 110 has tagged the storage volume associated with the PV-based object. If not, then storage service 110 does not have a corresponding storage volume object to be updated with the CO metadata and needs to be created first. At step 608, metadata sync service 306 calls API 509 of storage service 110 to provide updated CO metadata 314. The API call can be either CreateVolume or UpdateVolumeMetadata.

At step 612, storage service 110 updates a storage volume object with CO metadata 314 or creates a new storage volume object having CO metadata 314. At step 614, storage service 110 returns a result of the metadata update operation to metadata sync service 306. In parallel to steps 612 and 614, at step 616, storage service 110 performs database indexing and handles queries for information about the storage volumes, which is enriched with the CO metadata 314. At step 610, metadata sync service 306 logs the result of the metadata update operation. Method 600A can be repeated for each create/update event on a PV-based object.

Figure 6B:
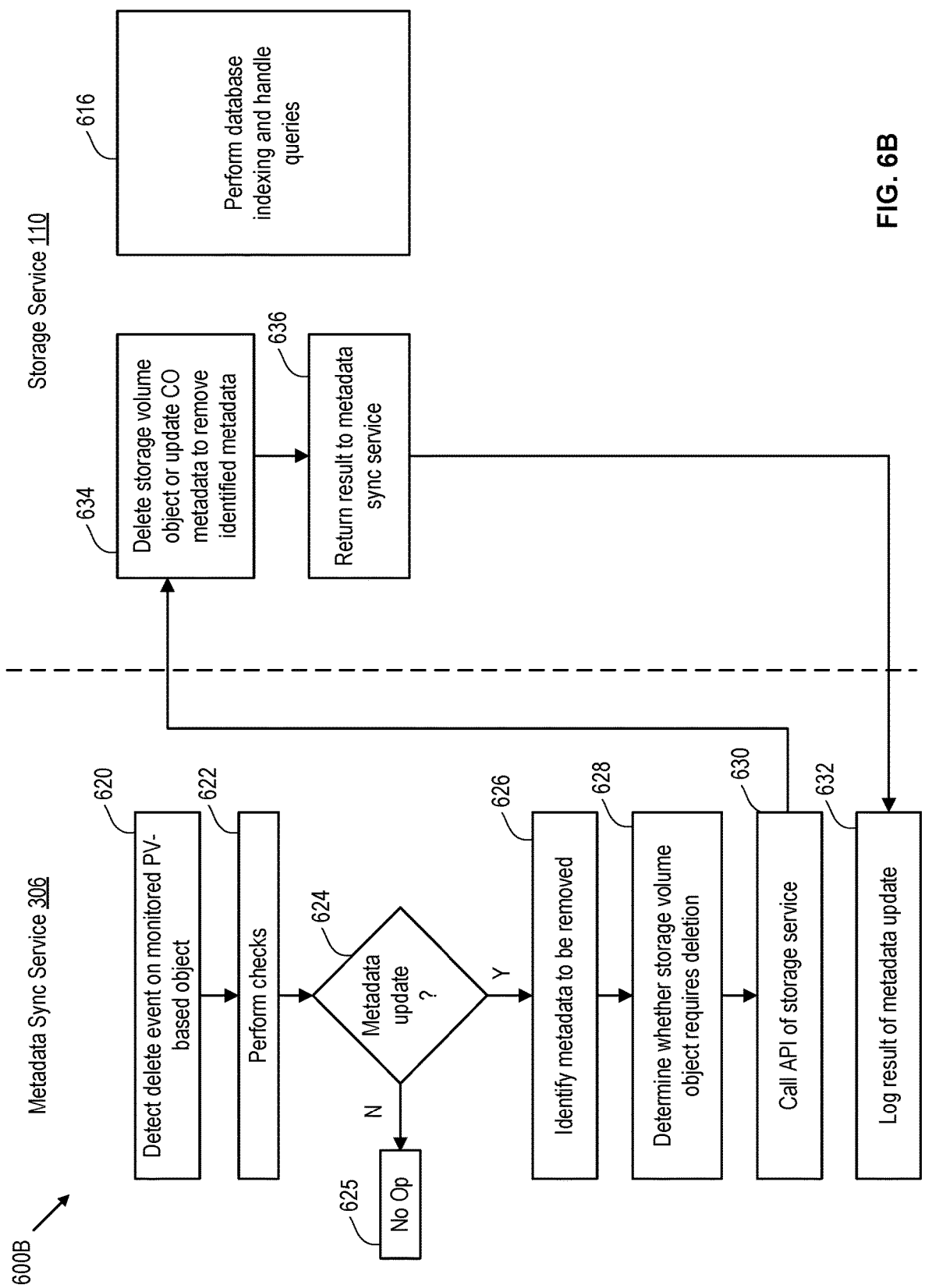
FIG. 6B is a flow diagram depicting a method of metadata synchronization for delete events in a virtualized computing system according to an embodiment.

FIG. 6B is a flow diagram depicting a method 600B of metadata synchronization for delete events in a virtualized computing system according to an embodiment. Method 600B can be performed by metadata sync service 306 in cooperation with storage service 110 executing on CPU, memory, storage, and network resources managed by virtualization layer(s) (e.g., hypervisor(s)) or a host operating system(s). Method 600B can be understood with reference to FIGS. 3 and 5A and can be performed for metadata synchronization in a vanilla container orchestration environment.

Method 600B begins at step 620, where metadata sync service 306 detects a delete event on a monitored PV-based object 320. At step 622, metadata sync service 306 performs one or more checks to determine if a metadata update is required. In embodiments, metadata sync service 306 does not perform a metadata update operation in cases where a PVC is unbound or PV is managed by another storage provider. At step 624, metadata sync service 306 determines if an update should proceed based on the checks in step 622. If not, method 600B proceeds to step 625 and performs no operation. Otherwise, method 600B proceeds to step 626.

At step 626, metadata sync service 306 identifies the metadata to be removed in response to the deletion of the PVC-based object. At step 628, metadata sync service 306 determines whether the storage volume corresponding to the deleted object should be un-tagged by storage service 110 (e.g., no more objects refer to the storage volume). At step 630, metadata sync service 306 calls API 509 of storage service 110 to request deletion of the identified metadata. The API call can be either DeleteVolume or UpdateVolumeMetadata.

At step 634, storage service 110 deletes the storage volume object if necessary or updates the CO metadata for a storage volume object to remove the identified metadata from the deleted PV-based object. At step 636, storage service 110 returns a result of the metadata update operation to metadata sync service 306. In parallel to steps 634 and 636, at step 616, storage service 110 performs database indexing and handles queries for information about the storage volumes, which is enriched with the CO metadata 314. At step 632, metadata sync service 306 logs the result of the metadata update operation and returns to step 602.

Figure 5B:
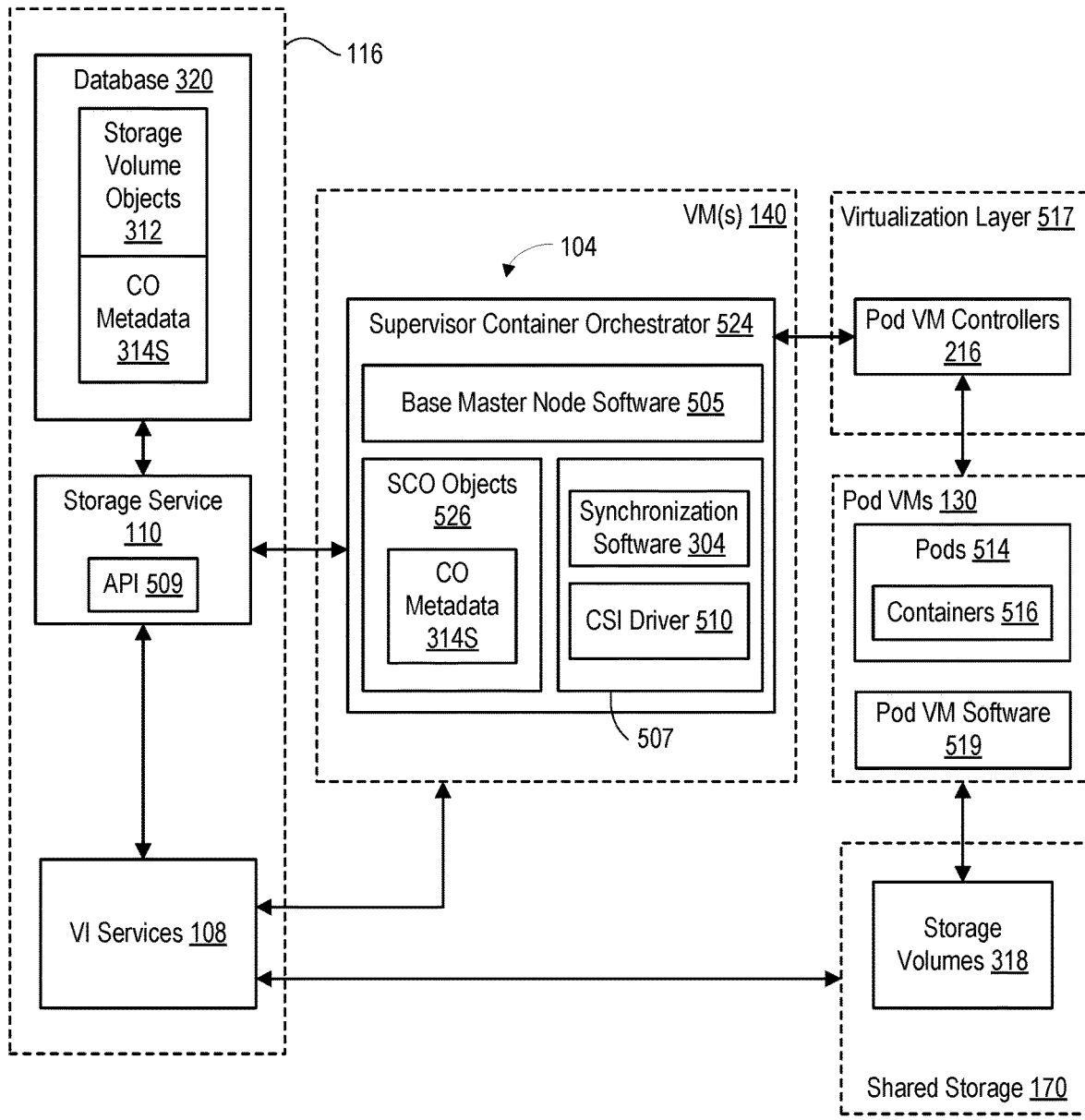
FIG. 5B is a block diagram depicting a logical view of supervisor cluster container orchestrator environment according to an embodiment.

FIG. 5B is a block diagram depicting a logical view of supervisor cluster container orchestrator environment according to an embodiment. In the present embodiment, host cluster 118 is enabled as a supervisor cluster 101. A supervisor container orchestrator 524 executes in one or more VMs 140 (e.g., in supervisor Kubernetes master(s) 104). Supervisor container orchestrator 524 can communicate with storage service 110 (e.g., through a management network). Supervisor container orchestrator 524 also communicates with pod VM controllers 216 in a virtualization layer 517 (e.g., hypervisors 150). As discussed above, pod VM controllers 216 manage pod VMs 130, which include pod VM software 519 (e.g., kernel 210, pod VM agent 212, container engine 208) that supports execution of pods 514 and containers 516 therein. Storage volumes 318 are attached and detached from pod VMs 130.

Supervisor container orchestrator 524 is configured similar to container orchestrator 502 and includes base master node software 505 and storage control plane 507. Users interact with base master node software 505 to create, update, and delete supervisor container orchestrator (SCO) objects 526, which include PV-based objects (e.g., PVs, PVCs, pods, and VMs). SCO objects 526 store CO metadata 314S, which is a version of CO metadata 314 described above generated by a supervisor container orchestrator 524. Synchronization software 304 pushes CO metadata 314S to storage service 110. For example, synchronization software 304 can invoke a metadata update API of storage service 110 to provide CO metadata 314S in response to lifecycle operations on PVs, PVCs, pods, and VMs. Synchronization software 304 can also perform full synchronization operations upon command or periodically to ensure CO metadata 314S stored in database 520 is consistent with CO metadata 314S maintained by supervisor container orchestrator 524.

In embodiments, orchestration control plane 115 extends supervisor container orchestrator 524 to deploy and manage applications on one or more other types of compute objects in addition to pods. For example, orchestration control plane 115 can extend base master node software 505 (e.g., via Kubernetes custom resource definitions (CRDs) or API extension server) to support VM objects backed by native VMs 140. The additional compute object(s) can consume persistent storage in a manner similar to pods (e.g., using PVCs bound to PVs). Synchronization software 304 can install informer(s) for events related to these additional compute object(s) in order to collect metadata therefrom. In embodiments, CO metadata 314S also includes metadata derived from VM objects (e.g., name, labels, etc.). The methods 600A and 600B of metadata synchronization shown in FIGS. 6A and 6B are equally applicable to the supervisor cluster container orchestrator environment shown in FIG. 5B.

Figure 5C:
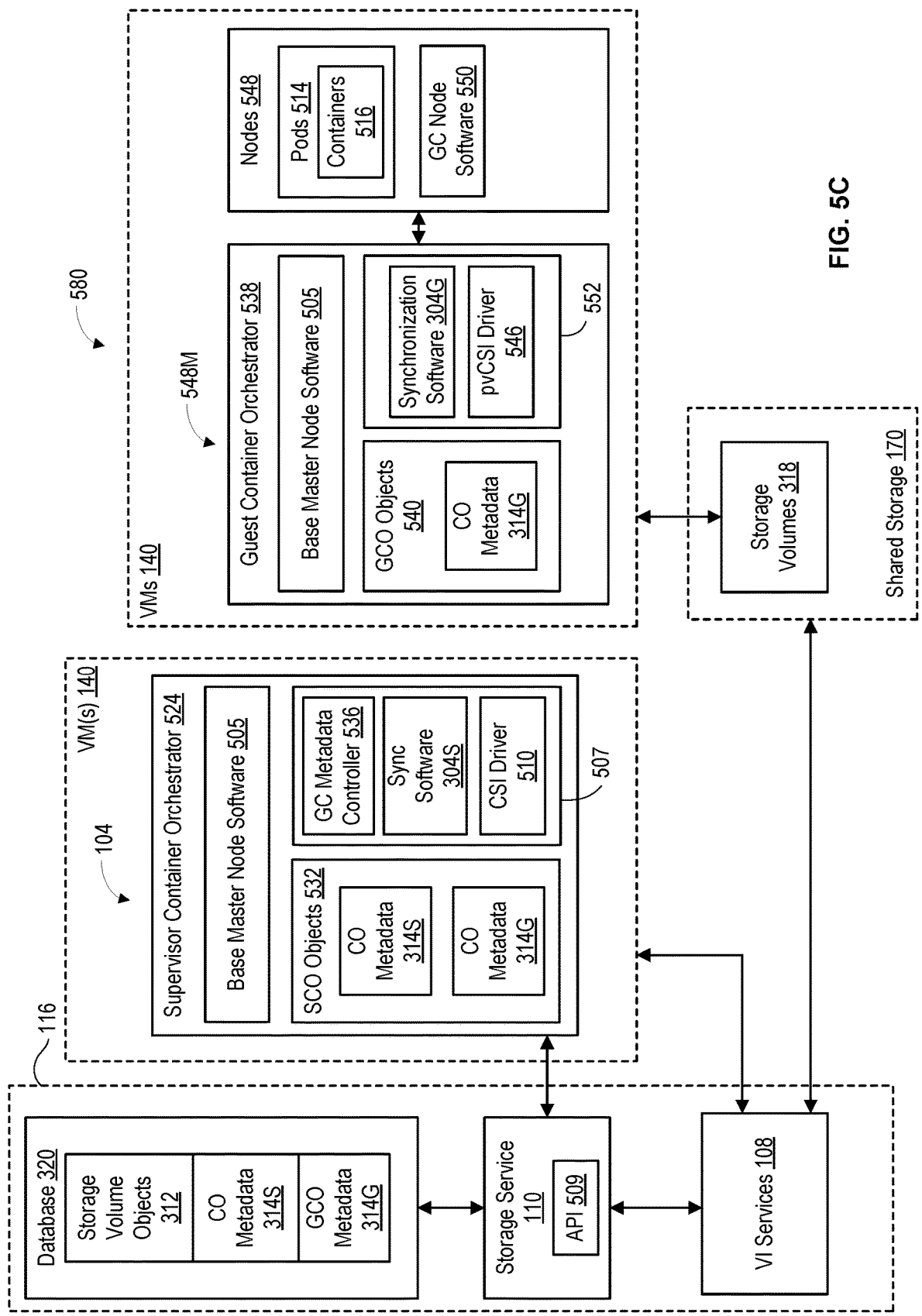
FIG. 5C is a block diagram depicting a logical view of a guest cluster container orchestrator environment according to an embodiment.

FIG. 5C is a block diagram depicting a logical view of a guest cluster container orchestrator environment according to an embodiment. In the embodiment, host cluster 118 is enabled as a supervisor cluster 101 and manages an application 141 comprising a guest cluster 580 (e.g., a guest Kubernetes cluster executing on top of supervisor cluster 101). Supervisor cluster 101 includes VM(s) 140 executing a supervisor container orchestrator 524 similar to the embodiment of FIG. 5B. In the present embodiment, however, storage control plane 507 includes guest cluster (GC) metadata controller 536 and synchronization software 304S. Synchronization software 304S can be identical to synchronization software 304 described above and operates to update storage service 110 with CO metadata 314S. Users interact with base master node software 505 to create, update, and delete SCO objects 532, which include guest cluster objects for deploying and managing guest cluster 580. The guest cluster objects include VM objects for native VMs 140 on which guest cluster 580 executes.

Guest cluster 580 includes nodes 548, which include at least one master node 548M. Master node(s) 548M execute guest container orchestrator 538. Guest container orchestrator 538 includes base master node software 505 and a storage control plane 552 executing as an extension of base master node software 505. Guest container orchestrator 538 and supervisor container orchestrator 524 can execute the same base master node software 505 (e.g., Kubernetes). Nodes 548 include GC node software 550, which can include a guest operating system, container runtime, kubelet, pvCSI node driver, and the like. GC node software 550 supports pods 514 that have containers 516 executing therein Containers 516 can use persistent volumes backed by storage volumes 318 attached to VMs 140 that support guest cluster 580.

Storage control plane 552 includes synchronization software 304G and a paravirtual CSI driver (pvCSI driver 546). In embodiments, guest cluster 580 is isolated from the management network and cannot communicate directly with storage service 110. Rather, guest cluster 580 communicates with supervisor container orchestrator 524 (e.g., via cluster network 186). Storage control plane 552 leverages storage control plane 507 of supervisor container orchestrator 524 to communicate with storage service 110. The pvCSI driver 546 performs persistent volume lifecycle operations for guest cluster 580 by modifying and/or creating SCO objects 532 in supervisor container orchestrator 524. In response, CSI driver 510 notices the modified and/or created SCO objects 532 and calls API 509 of storage service 110 to convert the persistent volume lifecycle operations of guest cluster 580 into operations on storage volumes 318.

Synchronization software 304G functions similar to synchronization software 304, with the exception that synchronization software 304G does not communicate directly with storage service 110. Users interact with base master node software 505 in guest container orchestrator 538 to create, update, and delete GCO objects 540 (e.g., PVs, PVCs, and pods). GCO objects 540 store CO metadata 314G, which is the same or similar to CO metadata 314 described above (e.g., names, labels, IDs, etc. for PVs, PVCs, and pods). Synchronization software 304G pushes CO metadata 314G to storage service 110 indirectly through supervisor container orchestrator 524 (an example of storage provider proxy 305). In embodiments, synchronization software 304G interacts with base master node software 505 in supervisor container orchestrator 524 to create and/or modify SCO objects 532 monitored by GC metadata controller 536. In embodiments, GC metadata controller 536 monitors for a CRD object in which synchronization software 304G can provide CO metadata 314G ("GC metadata object"). GC metadata controller 536 then calls API 509 of storage service 110 to enrich storage volume objects 312 with CO metadata 314G. Synchronization software 304G can also perform full synchronization operations upon command or periodically to ensure CO metadata 314G managed by supervisor container orchestrator 524 is consistent with CO metadata 314G managed by guest container orchestrator 538.

Figure 7A:
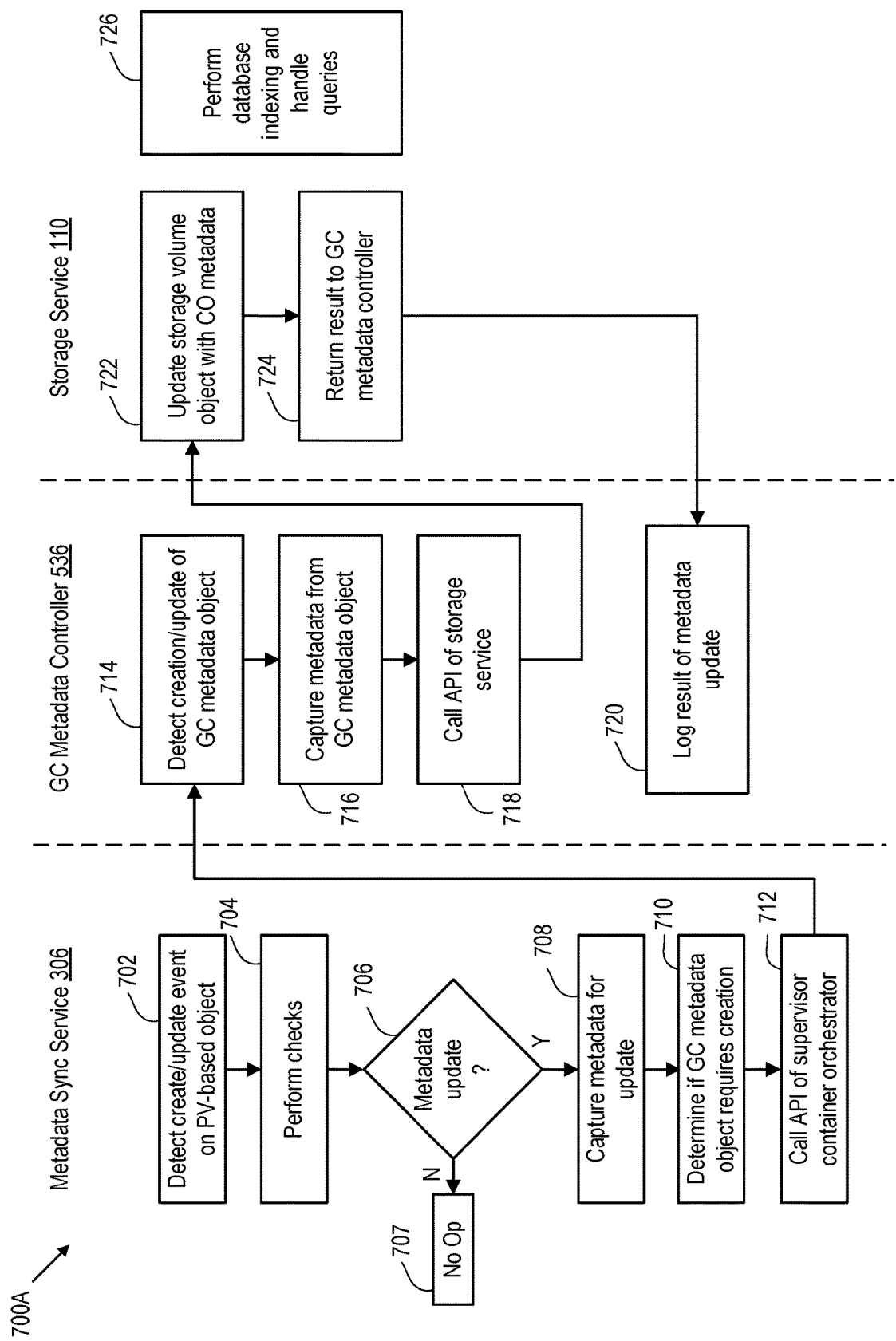
FIG. 7A is a flow diagram depicting a method of metadata synchronization for create/update events in a guest cluster executing in a virtualized computing system according to an embodiment.

FIG. 7A is a flow diagram depicting a method 700A of metadata synchronization for create/update events in a guest cluster executing in a virtualized computing system according to an embodiment. Method 700A can be performed by metadata sync service 306 in synchronization software 304G in cooperation with GC metadata controller 536 and storage service 110 executing on CPU, memory, storage, and network resources managed by virtualization layer(s) (e.g., hypervisor(s)) or a host operating system(s). Method 700A can be understood with reference to FIGS. 3 and 5C and can be performed for metadata synchronization in a guest cluster orchestration environment.

Method 700A begins at step 702, where metadata sync service 306 detects a create/update event on a monitored PV-based object 320. At step 704, performs one or more checks to determine if a metadata update is required. In embodiments, metadata sync service 306 does not perform a metadata update operation in cases where a PVC is unbound, a PV is not managed by storage service 110, the metadata in the object has not changed (i.e., the update event is for something other than an update to the metadata), or the current object status is pending/failed. At step 706, metadata sync service 306 determines if an update should proceed based on the checks in step 704. If not, method 700A proceeds to step 707 and performs no operation. Otherwise, method 700A proceeds to step 708.

At step 708, metadata sync service 306 captures the metadata from PV-based object associated with the events. At step 710, metadata sync service 306 determines if GC metadata object requires creation in supervisor container orchestrator 524 (e.g., in cases where GC metadata object for the guest cluster PV-object does not yet exist). At step 712, metadata sync service 306 calls API 509 of base master node software 505 in supervisor container orchestrator 524 to provide updated CO metadata 314G in a GC metadata object monitored by GC metadata controller 536. At step 714, GC metadata controller 536 detects creation/update of the GC metadata object. At step 716, GC metadata controller 536 captures metadata from the GC metadata object. At step 718, GC metadata controller 536 calls API 509 of storage service 110 to provide updated CO metadata 314G.

At step 722, storage service 110 updates a storage volume object with CO metadata 314G. At step 724, storage service 110 returns a result of the metadata update operation to GC metadata controller 536. In parallel to steps 722 and 724, storage service 110 performs database indexing and handles queries for information about the storage volumes, which is enriched with the CO metadata 314S and CO metadata 314G (step 726). At step 720, GC metadata controller 536 logs the result of the metadata update operation.

Figure 7B:
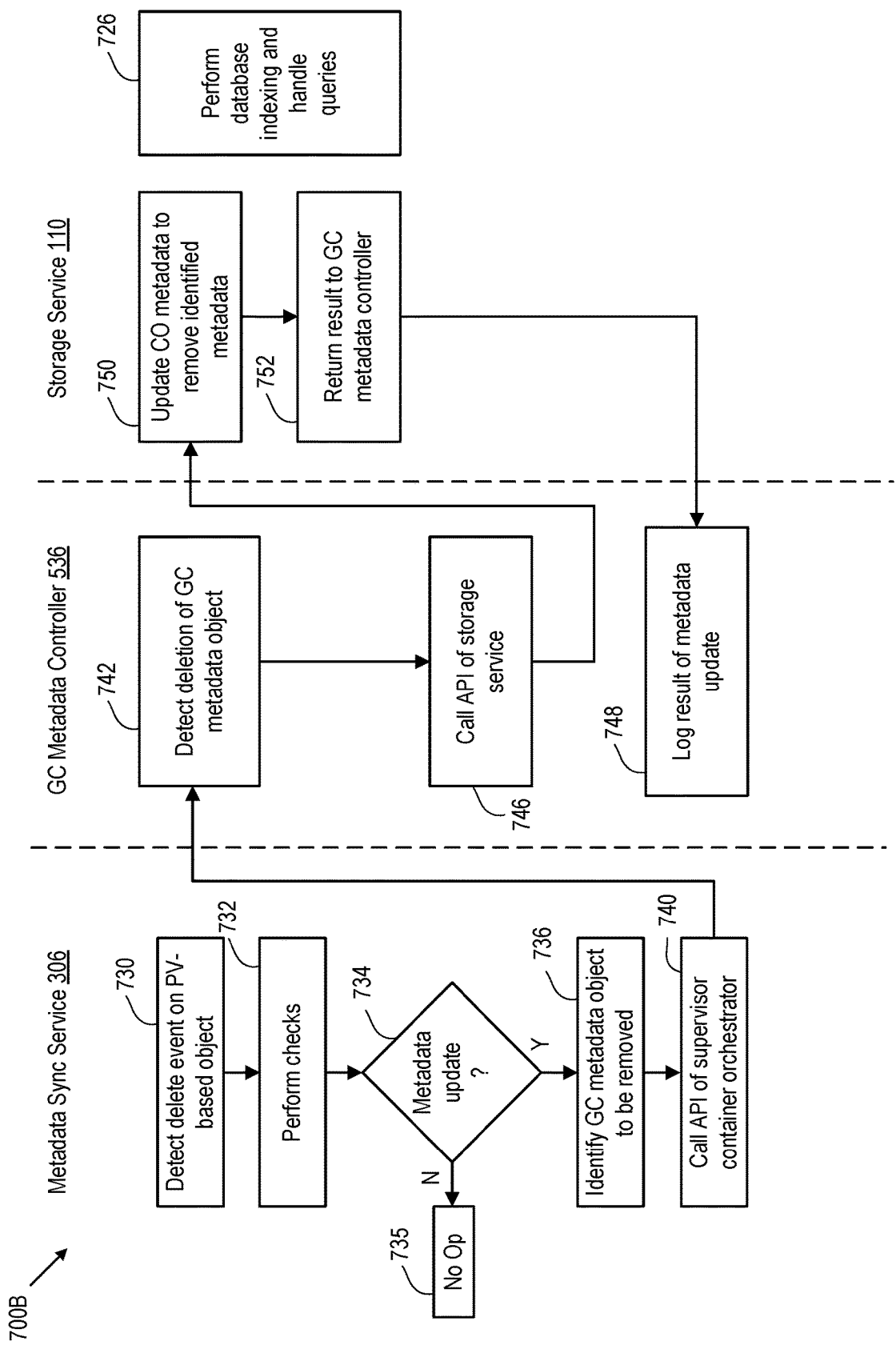
FIG. 7B is a flow diagram depicting a method of metadata synchronization for delete events in a guest cluster executing in a virtualized computing system according to an embodiment.

FIG. 7B is a flow diagram depicting a method 700B of metadata synchronization for delete events in a guest cluster executing in a virtualized computing system according to an embodiment. Method 700B can be performed by metadata sync service 306 in synchronization software 304G in cooperation with GC metadata controller 536 and storage service 110 executing on CPU, memory, storage, and network resources managed by virtualization layer(s) (e.g., hypervisor(s)) or a host operating system(s). Method 700B can be understood with reference to FIGS. 3 and 5C and can be performed for metadata synchronization in a guest cluster orchestration environment.

Method 700B begins at step 730, where metadata sync service 306 detects a delete event on a monitored PV-based object 320. At step 732, performs one or more checks to determine if a metadata update is required. In embodiments, metadata sync service 306 does not perform a metadata update operation in cases where a PVC is unbound or PV is managed by another storage provider. At step 734, metadata sync service 306 determines if an update should proceed based on the checks in step 732. If not, method 700B proceeds to step 735 and performs no operation. Otherwise, method 700B proceeds to step 736.

At step 736, metadata sync service 306 identifies the GC metadata object managed by supervisor container orchestrator 524 that should be deleted (e.g., the GC metadata object corresponding to the deleted guest cluster PV-based object). At step 740, metadata sync service 306 calls API 509 of base master node software 505 in supervisor container orchestrator 524 to delete the identified GC metadata object. At step 742, GC metadata controller 536 detects deletion of the GC metadata object. At step 746, GC metadata controller 536 calls API 509 of storage service 110 to provide updated CO metadata 314G.

At step 750, storage service 110 updates the CO metadata for a storage volume object to remove the identified metadata. At step 752, storage service 110 returns a result of the metadata update operation to GC metadata controller 536. In parallel to steps 750 and 752, storage service 110 performs database indexing and handles queries for information about the storage volumes, which is enriched with the CO metadata 314S and CO metadata 314G (step 726). At step 748, GC metadata controller 536 logs the result of the metadata update operation.

Figure 8A:
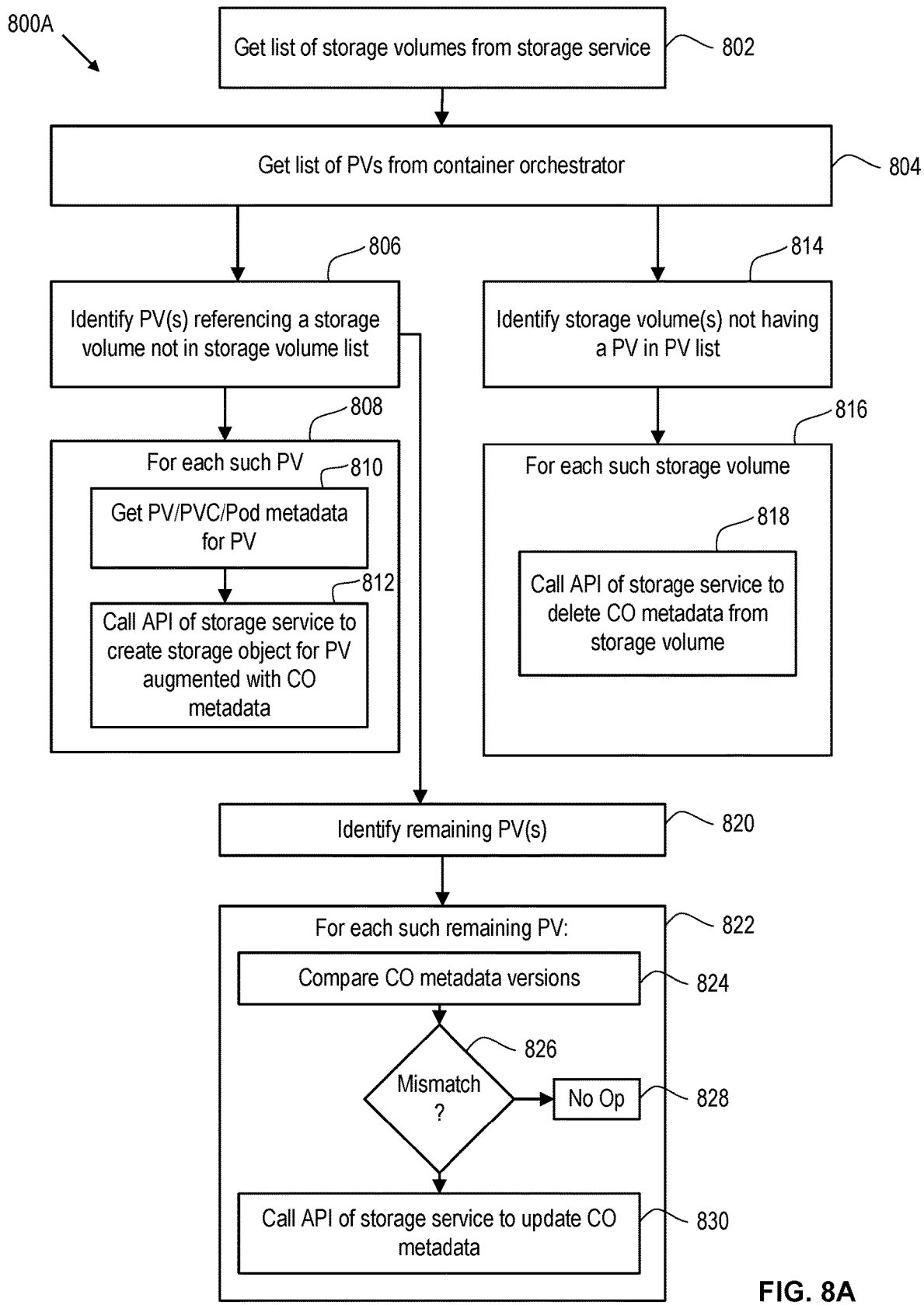
FIG. 8A is a flow diagram depicting a method of full synchronization in a vanilla or supervisor cluster container orchestration environment according to an embodiment.

FIG. 8A is a flow diagram depicting a method 800A of full synchronization in a vanilla or supervisor cluster container orchestration environment according to an embodiment. Method 800A can be performed by full sync service 308 in synchronization software 304 in cooperation with storage service 110 executing on CPU, memory, storage, and network resources managed by virtualization layer(s) (e.g., hypervisor(s)) or a host operating system(s).

Method 800A begins at step 802, where full sync service 308 obtains a list of storage volumes managed by storage service 110. At step 804, full sync service 308 obtains a list of PVs from the container orchestrator (e.g., container orchestrator 502 or supervisor container orchestrator 524). Method 800A then proceeds to identification steps 806 and 814. At step 806, full sync service 308 identifies PV(s) referencing a storage volume not in the list of storage volumes from storage service 110. At step 808, for each such PV, full sync service 308 performs steps 810 and 812. At step 810, full sync service 308 obtains PV/PVC/pod metadata from PVC(s) and/or pod(s) referencing the PV (and the PV metadata itself). At step 812, full sync service 308 calls an API of storage service 110 to create a storage object for the PV augmented with the CO metadata obtained at step

810. At step 814, full sync service 308 identifies storage volume(s) not having a PV in the PV list. At step 816, for each such storage volume, full sync service 308 performs step 818. At step 818, full sync service 308 calls an API of storage service 110 to delete CO metadata from the storage volume.

From step 806, method 800A also proceeds to step 820, where full sync service 308 identifies any remaining PV(s) not identified in step 806. These remaining PV(s) reference a storage volume in the storage volume list. At step 822, for each such remaining PV, full sync service 308 performs steps 824-830. At step 824, full sync service 308 compares the version of CO metadata in the PV with the version of CO metadata augmenting the storage object. At step 826, full sync service 308 determines if there is a mismatch. If not, method 800A proceeds to step 828 and performs no operation. Otherwise, method 800A proceeds to step 830, where full sync service 308 calls an API of storage service 110 to update the CO metadata of the storage object for the PV.

Figure 8B:
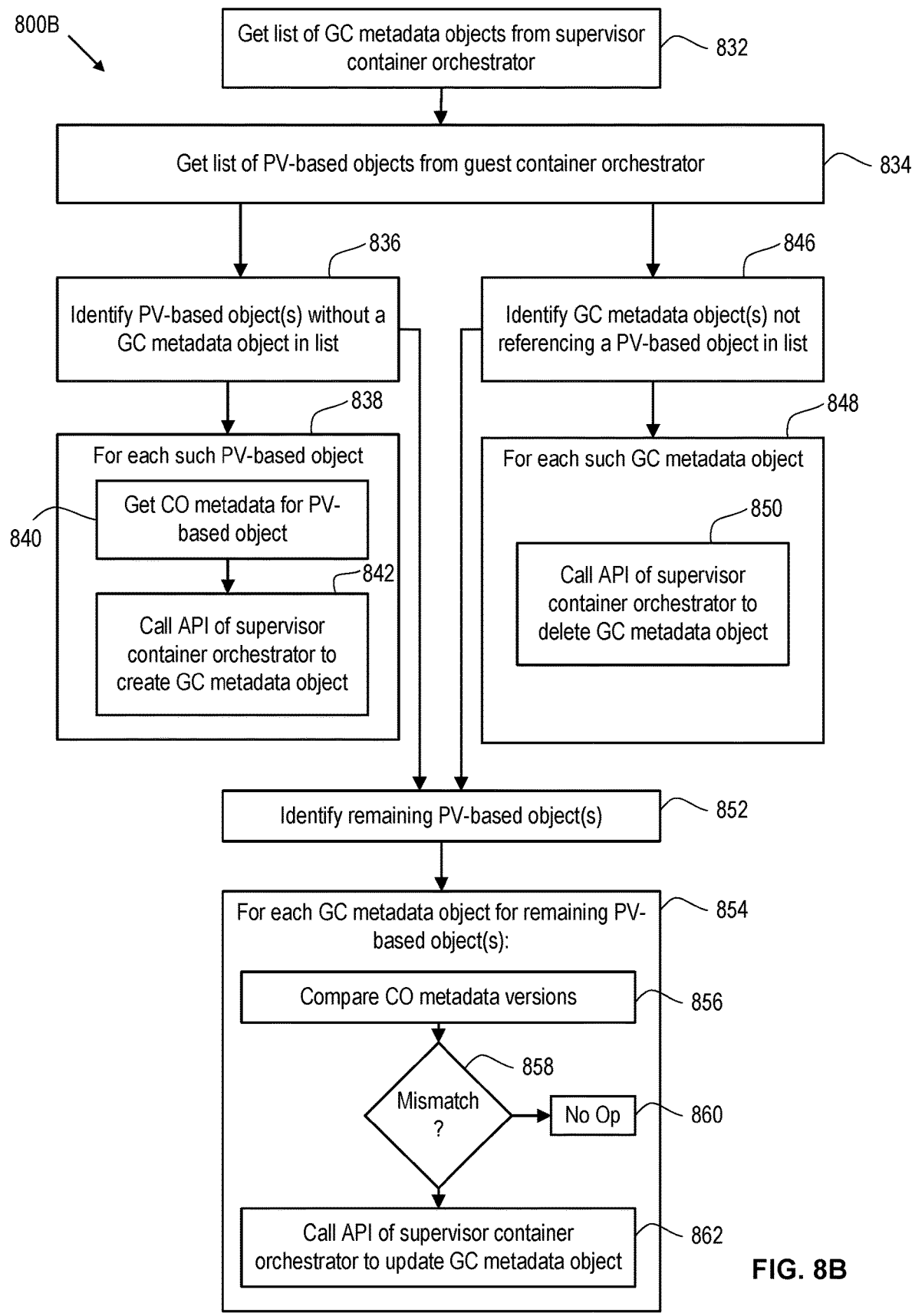
FIG. 8B is a flow diagram depicting a method of full synchronization in a guest cluster container orchestration environment according to an embodiment.

FIG. 8B is a flow diagram depicting a method 800B of full synchronization in a guest cluster container orchestration environment according to an embodiment. Method 800B can be performed by full sync service 308 in synchronization software 304G in cooperation with supervisor container orchestrator 524 executing on CPU, memory, storage, and network resources managed by virtualization layer(s) (e.g., hypervisor(s)) or a host operating system(s).

Method 800B begins at step 832, where full sync service 308 obtains a list of GC metadata objects managed by supervisor container orchestrator 524. At step 834, full sync service 308 obtains a list of PV-based objects from the guest container orchestrator 538. Method 800B then proceeds to identification steps 836 and 846. At step 836, full sync service 308 identifies PV-based object(s) without a corresponding GC metadata object. At step 838, for each such PV-based object, full sync service 308 performs steps 840 and 842. At step 840, full sync service 308 obtains the CO metadata for the PV-based object. At step 842, full sync service 308 calls an API of supervisor container orchestrator 524 to create a GC metadata object for the PV-based object having its CO metadata. At step 846, full sync service 308 identifies GC metadata object(s) not referencing a PV-based object in the list. At step 848, for each such GC metadata object, full sync service 308 performs step 850. At step 850, full sync service 308 calls an API of supervisor container orchestrator 524 to delete the GC metadata object.

From step 836, method 800B also proceeds to step 852, where full sync service 308 identifies any remaining PV-based object(s) not identified in step 836. These remaining PV-based object(s) have a corresponding GC metadata object in the list. At step 854, for each such remaining PV-based object, full sync service 308 performs steps 856-862. At step 856, full sync service 308 compares the version of CO metadata in the PV-based object with the version of CO metadata in the corresponding GC metadata object. At step 858, full sync service 308 determines if there is a mismatch. If not, method 800B proceeds to step 860 and performs no operation. Otherwise, method 800B proceeds to step 862, where full sync service 308 calls an API of supervisor container orchestrator 524 to update the GC metadata object for the PV-based object.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of enriching a storage provider of a virtualized computing system with metadata managed by a container orchestrator executing in the virtualized computing system, the method comprising:

detecting, by a metadata sync service executing as an extension of the container orchestrator, metadata that is included in a persistent volume-based (PV-based) object managed by the container orchestrator, the PV-based object referencing a persistent volume; and pushing, by the metadata sync service, the metadata to the storage provider to augment a storage volume object managed by the storage provider, the storage volume object referencing a storage volume backing the persistent volume.

2. The method of claim 1, wherein the step of pushing the metadata comprises:

invoking, by the metadata sync service, an application programming interface (API) of the storage provider to provide the metadata.

3. The method of claim 2, wherein the virtualized computing system comprises a cluster of hosts having a virtualization layer executing on hardware platforms of the hosts, and wherein the container orchestrator and the metadata sync service executes in at least one virtual machine (VM) supported by the virtualization layer.

4. The method of claim 3, wherein the virtualized computing system comprises an orchestration control plane integrated with the virtualization layer, and wherein the orchestration control plane includes the container orchestrator and the metadata sync service.

5. The method of claim 2, further comprising:

obtaining, by a full sync service executing in the virtualized computing system, a first version of the metadata as maintained by the storage provider and a second version of the metadata as maintained by the container orchestrator; and updating, by the full sync service, the first version of the metadata to be consistent with the second version of the metadata.

6. The method of claim 2, further comprising:

detecting, by the metadata sync service, deletion of the PV-based object; and requesting, by the metadata sync service, removal of the metadata from the storage provider.

7. The method of claim 1, wherein the step of pushing the metadata comprises:

invoking, by the metadata sync service, an application programming interface (API) of a supervisor container orchestrator executing in the virtualized computing system to update a metadata object to include the metadata; and invoking, by a controller of the supervisor container orchestrator in response to the metadata object, an API of the storage provider to provide the metadata.

8. The method of claim 7, wherein the virtualized computing system comprises a cluster of hosts having a virtualization layer executing on hardware platforms of the hosts, and an orchestration control plane integrated with the virtualization layer, wherein the orchestration control plane includes the supervisor container orchestrator, and wherein the container orchestrator and the metadata sync service are included in an application deployed by the supervisor container orchestrator on at least one virtual machine (VM) supported by the virtualization layer.

9. The method of claim 7, further comprising:

obtaining, by a full sync service executing in the virtualized computing system, a first version of the metadata as maintained by the supervisor container orchestrator and a second version of the metadata as maintained by the container orchestrator; and updating, by the full sync service, the first version of the metadata to be consistent with the second version of the metadata.

10. The method of claim 1, wherein the step of detecting comprises:

monitoring, by the metadata sync service, an event generated by an application programming interface (API) server of the container orchestrator, where the event is an add or update event for addition or update of the PV-based object; and obtaining, by the metadata sync service, the metadata from the PV-based object in response to the event.

11. A non-transitory computer readable medium comprising instructions to be executed in a computing device to cause the computing device to carry out a method of enriching a storage provider of a virtualized computing system with metadata managed by a container orchestrator executing in the virtualized computing system, the method comprising:

detecting, by a metadata sync service executing as an extension of the container orchestrator, metadata that is included in a persistent volume-based (PV-based) object managed by the container orchestrator, the PV-based object referencing a persistent volume; and pushing, by the metadata sync service, the metadata to the storage provider to augment a storage volume object managed by the storage provider, the storage volume object referencing a storage volume backing the persistent volume.

12. The non-transitory computer readable medium of claim 11, wherein the step of pushing the metadata comprises:

invoking, by the metadata sync service, an application programming interface (API) of the storage provider to provide the metadata.

13. The non-transitory computer readable medium of claim 12, wherein the virtualized computing system comprises a cluster of hosts having a virtualization layer executing on hardware platforms of the hosts, and wherein the container orchestrator and the metadata sync service executes in at least one virtual machine (VM) supported by the virtualization layer.

14. The non-transitory computer readable medium of claim 13, wherein the virtualized computing system comprises an orchestration control plane integrated with the virtualization layer, and wherein the orchestration control plane includes the container orchestrator and the metadata sync service.

15. The non-transitory computer readable medium of claim 12, further comprising:

obtaining, by a full sync service executing in the virtualized computing system, a first version of the metadata as maintained by the storage provider and a second version of the metadata as maintained by the container orchestrator; and updating, by the full sync service, the first version of the metadata to be consistent with the second version of the metadata.

16. The non-transitory computer readable medium of claim 11, wherein the step of pushing the metadata comprises:

invoking, by the metadata sync service, an application programming interface (API) of a supervisor container orchestrator executing in the virtualized computing system to update a metadata object to include the metadata; and invoking, by a controller of the supervisor container orchestrator in response to the metadata object, an API of the storage provider to provide the metadata.

17. The non-transitory computer readable medium of claim 16, wherein the virtualized computing system comprises a cluster of hosts having a virtualization layer executing on hardware platforms of the hosts, and an orchestration control plane integrated with the virtualization layer, wherein the orchestration control plane includes the supervisor container orchestrator, and wherein the container orchestrator and the metadata sync service are included in an application deployed by the supervisor container orchestrator on at least one virtual machine (VM) supported by the virtualization layer.

18. The non-transitory computer readable medium of claim 16, further comprising:
   obtaining, by a full sync service executing in the virtualized computing system, a first version of the metadata as maintained by the supervisor container orchestrator and a second version of the metadata as maintained by the container orchestrator; and
   updating, by the full sync service, the first version of the metadata to be consistent with the second version of the metadata.

19. A virtualized computing system having a host cluster of hosts having a virtualization layer executing on hardware platforms of the hosts, the virtualized computing system comprising:
   shared storage, accessible by the host cluster, having storage volumes stored thereon;
   a storage provider having a database of storage volume objects associated with the storage volumes;
   a container orchestrator executing on the host cluster in one or more virtual machines supported by the virtualization layer, the container orchestrator configured to manage persistent volume-based (PV-based) objects having container orchestrator (CO) metadata; and
   synchronization software executing on the one or more virtual machines, the synchronization software configured to:
      detect metadata that is included in a first PV-based object of the PV-based objects managed by the container orchestrator, the first PV-based object referencing a persistent volume; and
      push the metadata to the storage provider to augment a first storage volume object of the storage volume objects, the first storage volume object referencing a first storage volume of the storage volumes backing the persistent volume.

20. The virtualized computing system of claim 19, further comprising:
   a storage provider proxy in communication with the synchronization software and the storage provider, wherein the synchronization software is configured to push the metadata to the storage provider through the storage provide proxy.

* * * * *